(12) United States Patent     (10) Patent No.:    US 12,665,356 B2

Tanai              (45) Date of Patent:      Jun. 23, 2026

(54) CHARGING INLET

(71) Applicant: TOYOTA JIDOSHA KABUSHIKI KAISHA, Toyota (JP)

(72) Inventor: Yutaka Tanai, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 373 days.

(21) Appl. No.: 18/584,501

(22) Filed: Feb. 22, 2024

(65) Prior Publication Data

US 2024/0313485 A1     Sep. 19, 2024

(30) Foreign Application Priority Data

Mar. 17, 2023    (JP) ................................. 2023-043413

(51) Int. Cl.
| | |
|---|---|
| *H01R 13/66* | (2006.01) |
| *B60L 53/16* | (2019.01) |
| *H01R 13/447* | (2006.01) |
| *H01R 103/00* | (2006.01) |

(52) U.S. Cl.
CPC ........... *H01R 13/665* (2013.01); *B60L 53/16* (2019.02); *H01R 13/447* (2013.01); *H01R 2103/00* (2013.01); *H01R 2201/26* (2013.01)

(58) Field of Classification Search
CPC ................ H01R 13/665; H01R 13/447; H01R 2103/00; H01R 2201/26

USPC .......................................................... 439/142
See application file for complete search history.

(56) References Cited

U.S. PATENT DOCUMENTS 7,960,650 B2 *   6/2011   Richter ................ H01R 4/4823
                                             174/64

FOREIGN PATENT DOCUMENTS

| EP | 4438388 A1 * | 10/2024 | .............. B60L 53/35 |
|---|---|---|---|
| JP | 2016-088251 A | 5/2016 | |
| JP | 2020-156250 A | 9/2020 | |

* cited by examiner

*Primary Examiner* — Gary F Paumen

(74) *Attorney, Agent, or Firm* — Sughrue Mion, PLLC

(57)             ABSTRACT

A charging inlet of the present disclosure includes: a casing; and a cover member. The charging inlet electrically connects the charging terminal and a terminal of a charging connector to each other by inserting the charging connector from the opening portion in a state in which the cover member is open. The charging inlet further includes: a heater provided in the cover member and heating the cover member by generating heat by energization; and a heater terminal provided on the cover member and electrically connected to the heater. The heater terminal is disposed on a surface of the cover member facing the charging terminal such that the charging terminal and the heater terminal come into contact with each other in a state in which the cover member is closed.

2 Claims, 5 Drawing Sheets

CHARGING INLET

CROSS-REFERENCE TO RELATED APPLICATION

This application claims priority to Japanese Patent Application No. 2023-043413 filed on Mar. 17, 2023, incorporated herein by reference in its entirety.

BACKGROUND

1. Technical Field

The present disclosure relates to a charging inlet.

2. Description of Related Art

Japanese Unexamined Patent Application Publication No. 2016-088251 discloses a technology including a heater in a charging lid that opens and closes a charging port. The technology performs unfreezing by heating the charging lid by generating heat by the heater by energization using dedicated electricity wiring for supplying electricity to the heater from a battery of a vehicle.

SUMMARY

In a configuration in which electricity is supplied to a heater provided in a cover member that opens and closes an opening portion of a charging inlet from a battery of a vehicle with use of dedicated electricity wiring, it becomes difficult to perform routing of the electricity wiring with respect to the cover member, and the structure becomes complicated.

The present disclosure has been made in view of the problem described above and an object thereof is to provide a charging inlet capable of unfreezing a cover member by a simple structure.

In order to solve the problem and achieve the object described above, a charging inlet includes: a casing inside which a charging terminal to be electrically connected to an electricity storage apparatus provided in a vehicle is housed; and a cover member provided in the casing so as to be able to open and close an opening portion formed in the casing. The charging inlet electrically connects the charging terminal and a terminal of a charging connector to each other by inserting the charging connector from the opening portion in a state in which the cover member is open. The charging inlet further includes: a heater that is provided in the cover member and heats the cover member by generating heat by energization; and a heater terminal provided on the cover member and electrically connected to the heater. The heater terminal is disposed on a surface of the cover member facing the charging terminal such that the charging terminal and the heater terminal come into contact with each other in a state in which the cover member is closed.

As a result, the charging inlet according to the present disclosure is capable of unfreezing the cover member by a simple structure.

In the above, an automatic opening/closing apparatus that automatically opens and closes the cover member may further be included.

As a result, the cover member can automatically open after the cover member is unfrozen.

The charging inlet according to the present disclosure exhibits the effect of being able to unfreeze the cover member by a simple structure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of a charging inlet according to the present disclosure is described below. The present disclosure is not limited by the present embodiment.

Figure 1:
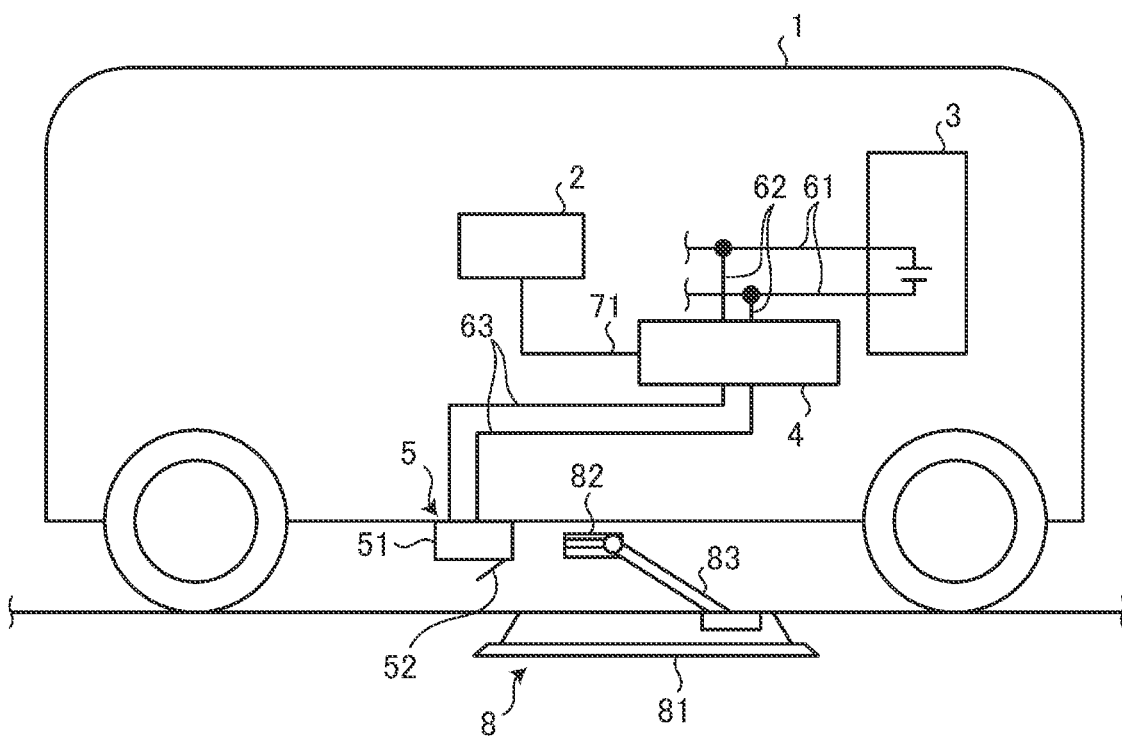
FIG. 1 is a view schematically showing an automatic parking system in an embodiment.

FIG. 1 is a view schematically showing an automatic charging system in the embodiment. The automatic charging system includes a vehicle 1 and an automatic charging apparatus 8. The automatic charging system is a system in which the automatic charging apparatus 8 automatically connects to the vehicle 1 parked in a parking space in which the automatic charging apparatus 8 is provided and supplies electricity to the vehicle 1.

The vehicle 1 is an electrified vehicle capable of being charged with electricity supplied from an external power source and is configured by a battery electric vehicle (BEV) and a plug-in hybrid electric vehicle (PHEV), for example. The vehicle 1 is a vehicle that can be parked in the parking space in which the automatic charging apparatus 8 is installed. The vehicle 1 includes an ECU 2, a battery 3, a charging relay 4, a charging inlet 5, electricity wiring 61, 62, 63, a communication line 71, a communication apparatus (not shown), and the like.

The charging inlet 5 is a charging port and receives electricity supplied from the automatic charging apparatus 8 connected to the external power source (not shown). As shown in FIG. 1, the charging inlet 5 is provided on a bottom portion of the vehicle 1. A charging connector 82 of the automatic charging apparatus 8 is connected to the charging inlet 5. The vehicle 1 can receive electricity supplied from the automatic charging apparatus 8 in a state in which the charging connector 82 is inserted into (connected to) the charging inlet 5. The vehicle 1 supplies the electricity received from the automatic charging apparatus 8 to the battery 3 from the charging inlet 5. The charging inlet 5 and the battery 3 are electrically connected to each other via the electricity wiring 63, the charging relay 4, the electricity wiring 62, and the electricity wiring 61. The charging relay 4 is connected to the ECU 2 via the communication line 71.

The charging inlet 5 has an inlet case 51 that is a casing in which charging terminals 511 (see FIG. 2) described below to which the charging connector 82 is electrically connected is provided on the inside, and an inlet cover 52 that is a cover member that opens and closes an opening portion of the inlet case 51. The opening portion of the inlet case 51 is formed by opening a side surface on one side in the front-rear direction of the vehicle 1 in the box-like inlet case 51, for example. The inlet cover 52 is attached to the inlet case 51 by a hinge (not shown) and the opening portion of the inlet case 51 can be rotated in an opening direction and a closing direction about the hinge serving as a rotation center. The inlet cover 52 is configured to automatically open and close with respect to the inlet case 51 by an automatic opening/closing apparatus (not shown) provided in the charging inlet 5. The automatic opening/closing apparatus has a cover driving motor (not shown) that is a driving source for opening and closing the inlet cover 52 by rotating the inlet cover 52 about the hinge serving as a rotation center. The driving of the cover driving motor is controlled by the ECU 2. The automatic opening/closing apparatus has a torque detection sensor (not shown) that detects the torque of the cover driving motor. Information relating to the torque of the cover driving motor detected by the torque detection sensor is transmitted to the ECU 2 and used in the control of opening/closing operation of the inlet cover 52. The inlet cover 52 may also be provided so as to be manually openable and closable with respect to the inlet case 51 when a user operates the inlet cover 52. In the charging inlet 5, the charging connector 82 is inserted from the opening portion of the inlet case 51 in a state in which the inlet cover 52 is open. As a result, the charging terminals 511 of the charging inlet 5 and a terminal (not shown) of the charging connector 82 are electrically connected to each other.

The battery 3 is an electricity storage apparatus and is an in-vehicle battery with which external charging is possible. The battery 3 is a secondary battery that can store therein electricity supplied from the charging inlet 5. The battery 3 is configured by a lithium ion battery, for example. The battery 3 stores therein electricity supplied from the external power source connected via the charging inlet 5. The battery 3 supplies electricity to a traveling motor of the vehicle 1. The traveling motor is electrically connected to the battery 3 via the electricity wiring 61.

The ECU 2 is an electronic control apparatus that executes charging control of storing electricity received by the charging inlet 5 into the battery 3. The electronic control apparatus includes a processor and a memory (main storage unit). The processor is configured by a central processing unit (CPU) and the like. The memory is configured by a random access memory (RAM), a read only memory (ROM), and the like. Signals from various sensors mounted on the vehicle 1 are input to the ECU 2. The ECU 2 executes the charging control on the basis of the signals input from the various sensors.

The automatic charging apparatus 8 is equipment that is installed in the parking space and supplies electricity to the vehicle 1 by automatically connecting the charging connector 82 to the vehicle 1 that has finished parking in the parking space, for example. The automatic charging apparatus 8 includes a charging apparatus main body 81, the charging connector 82, a connection mechanism 83, a control apparatus (not shown), and a communication apparatus (not shown).

The charging apparatus main body 81 is installed on the ground of the parking space and is electrically connected to an external power source such as a commercial power source and a household power source, for example. The charging connector 82 is a connector automatically connected to the charging inlet 5. The charging connector 82 is joined to the connection mechanism 83. The connection mechanism 83 is controlled by the control apparatus provided in the charging apparatus main body 81. The position of the charging connector 82 can be automatically changed by the connection mechanism 83. The charging connector 82 is electrically connected to the charging apparatus main body 81 via a charging cable (not shown). In the automatic charging apparatus 8, the electricity supplied from the external power source is converted to electricity to be transmitted and is output to the charging connector 82.

It is possible to automatically insert the charging connector 82 into the charging inlet 5 and perform external charging in a state in which the vehicle 1 has finished parking in the parking space in which the automatic charging apparatus 8 is installed. In the automatic charging system, the charging connector 82 is automatically connected to the charging inlet 5 and electricity is supplied from the automatic charging apparatus 8 to the vehicle 1 in a state in which wireless communication by communication apparatuses of the vehicle 1 and the automatic charging apparatus 8 is established between the vehicle 1 and the automatic charging apparatus 8. In the vehicle 1, control of supplying electricity received by the charging inlet 5 to the battery 3 is performed.

The charging relay 4 is a relay for electrically connecting and cutting off the battery 3 and the charging inlet 5 to and from each other. The charging relay 4 is electrically connected between the battery 3 and the charging inlet 5. The charging relay 4 is electrically connected to the battery 3 via the electricity wiring 61, 62. The charging relay 4 is electrically connected to the charging inlet 5 via the electricity wiring 63. The charging relay 4 switches between the closed state and the open state in accordance with a control signal from the ECU 2. The ECU 2 turns the charging relay 4 ON and places the charging relay 4 in a closed state when automatic charging is performed by the automatic charging apparatus 8 and turns the charging relay 4 OFF and places the charging relay 4 in an open state when automatic charging is not performed by the automatic charging apparatus 8, for example.

Figure 2:
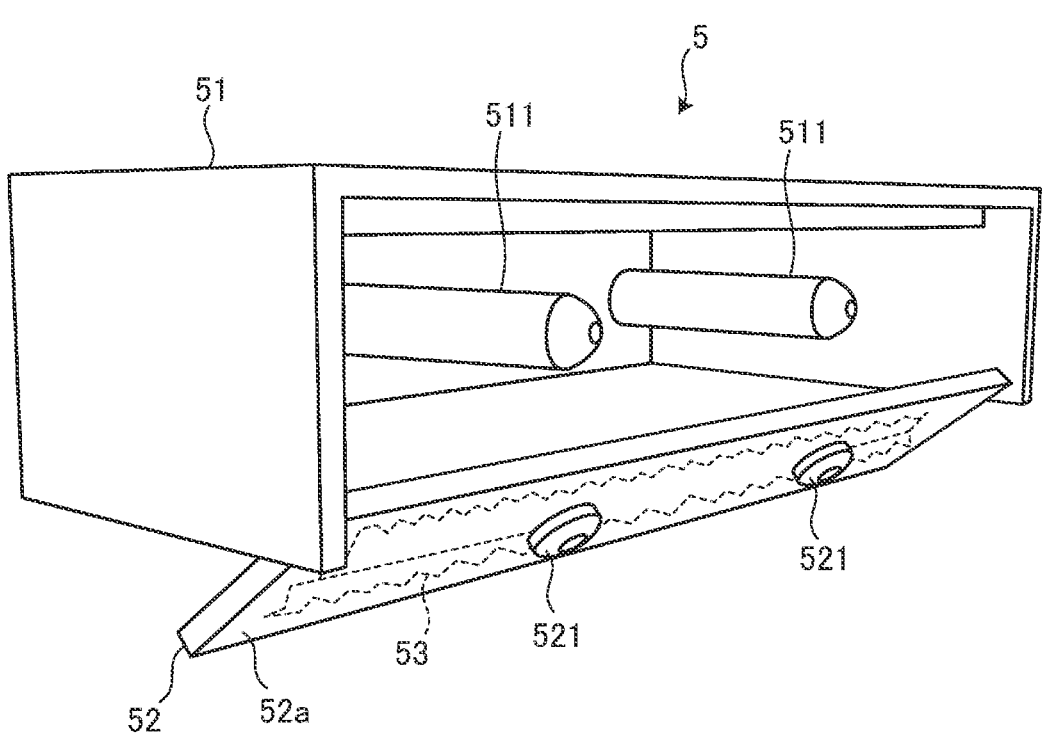
FIG. 2 is a perspective view of an inlet diagonally seen from a side in a state in which an inlet cover is open.
Figure 3:
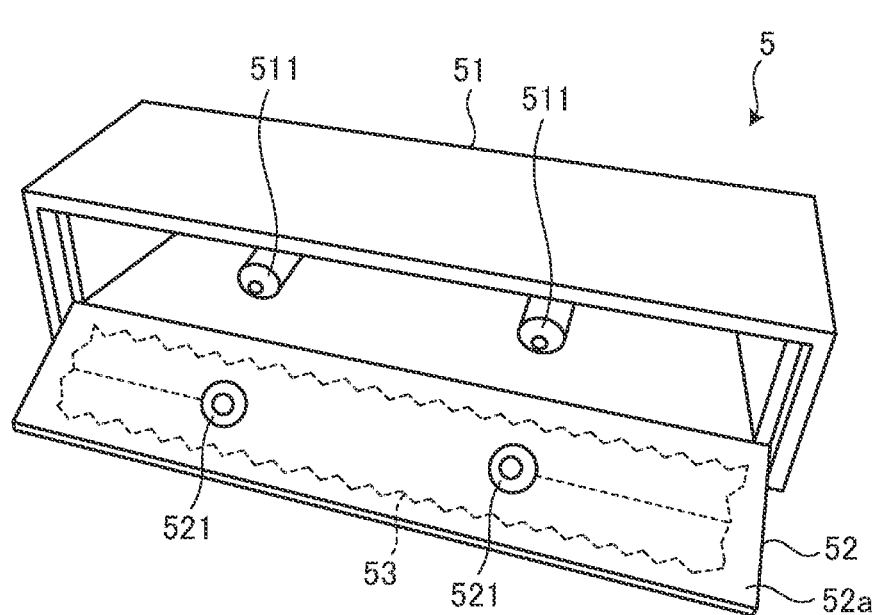
FIG. 3 is a perspective view of the inlet diagonally seen from above in the state in which the inlet cover is open.
Figure 4:
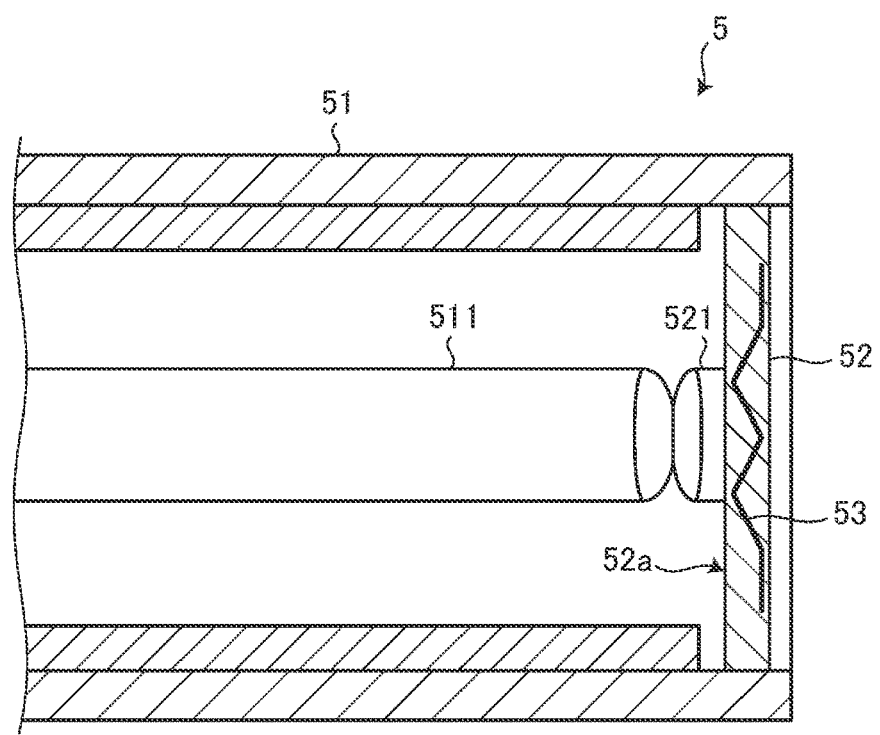
FIG. 4 is a sectional view of the inlet in a state in which the inlet cover is closed.

FIG. 2 is a perspective view of the charging inlet 5 diagonally seen from a side in a state in which the inlet cover 52 is open. FIG. 3 is a perspective view of the charging inlet 5 diagonally seen from above in a state in which the inlet cover 52 is open. FIG. 4 is a sectional view of the charging inlet 5 in a state in which the inlet cover 52 is closed.

As shown in FIG. 2 and FIG. 3, in a state in which the inlet cover 52 is open in the charging inlet 5, the two rod-like charging terminals 511 provided in the inlet case 51 are exposed to the outside. As shown in FIG. 4, in a state in which the inlet cover 52 is closed in the charging inlet 5, the two charging terminals 511 provided in the inlet case 51 are not exposed to the outside. The two charging terminals 511 are electrically connected to the electricity wiring 63 provided in the vehicle 1. The two charging terminals 511 are disposed in the inlet case 51 such that distal ends face the opening portion formed in the inlet case 51 covered by the inlet cover 52.

In the charging inlet 5, a heater 53 formed by a heating wire that generates heat by energization for heating the inlet cover 52 is provided in the inlet cover 52. The heater 53 is annularly disposed around the entire periphery of edges on the inside of the inlet cover 52. On the inside of the inlet cover 52, the heater 53 is electrically connected to two heater terminals 521 disposed on the inner side of the annularly disposed heater 53. The two heater terminals 521 are disposed on an inner wall surface 52a of the inlet cover 52 so as to come into contact with and be electrically connected to the distal ends of the two charging terminals 511 in a state in which the inlet cover 52 is closed with respect to the inlet case 51. The inner wall surface 52a of the inlet cover 52 is a surface that faces the distal ends of the charging terminals 511 provided in the inlet case 51.

In the vehicle 1 according to the embodiment, there is a concern that the inlet cover 52 cannot automatically open with respect to the inlet case 51 when the inlet cover 52 is frozen when automatic charging is performed by the automatic charging apparatus 8. Therefore, the ECU 2 supplies electricity from the battery 3 to the heater 53 by turning the charging relay 4 ON when the outdoor air temperature that is a temperature around the vehicle 1 (charging inlet 5) is less than a preset threshold value, for example, less than 5 [° C.] on the basis of a detection result of an air temperature sensor (not shown). In the charging inlet 5 included in the vehicle 1 according to the embodiment, unfreezing is performed by heating the inlet cover 52 by the heat of the heater 53 as above.

In the vehicle 1 according to the embodiment, the charging terminals 511 and the heater terminals 521 are electrically connected to each other in a state in which the inlet cover 52 is closed in the charging inlet 5. Therefore, it becomes easy to perform routing of the electricity wiring with respect to the inlet cover 52. In the vehicle 1 according to the embodiment, in the charging inlet 5, it becomes possible to supply electricity to the heater 53 with use of the existing charging relay 4 and electricity wiring 61, 62, 63 for the charging without additionally providing dedicated electricity wiring, relays, and the like for supplying electricity to the heater 53. As a result, it becomes possible to unfreeze the inlet cover 52 by a simple structure in the charging inlet 5 included in the vehicle 1 according to the embodiment.

Figure 5:
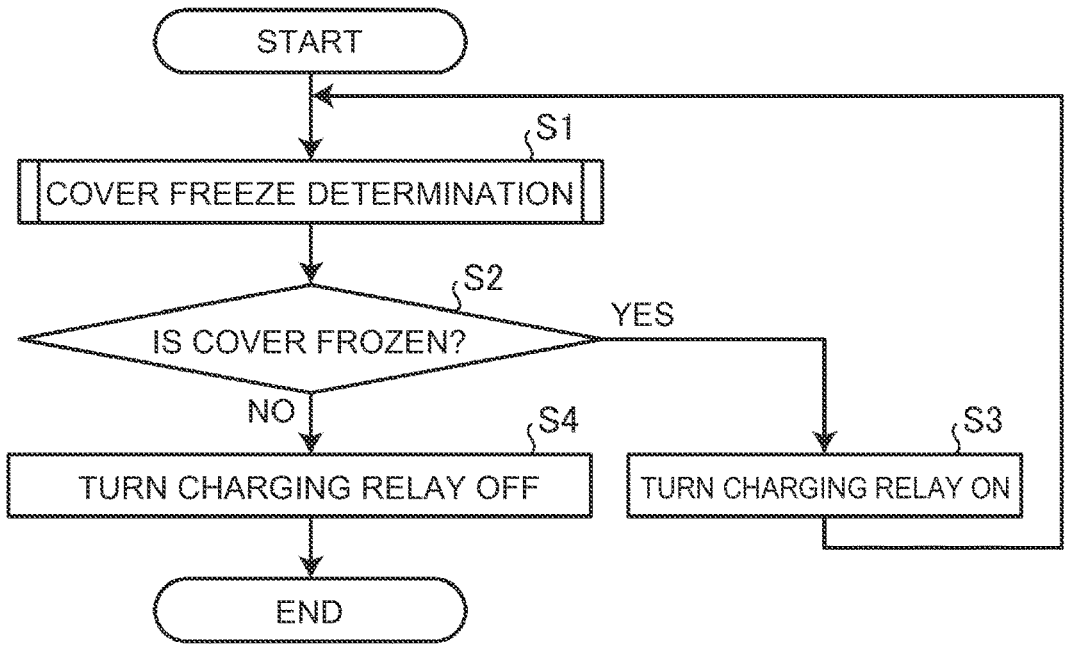
FIG. 5 is a flowchart showing one example of unfreezing control of the inlet cover according to the embodiment.
Figure 6:
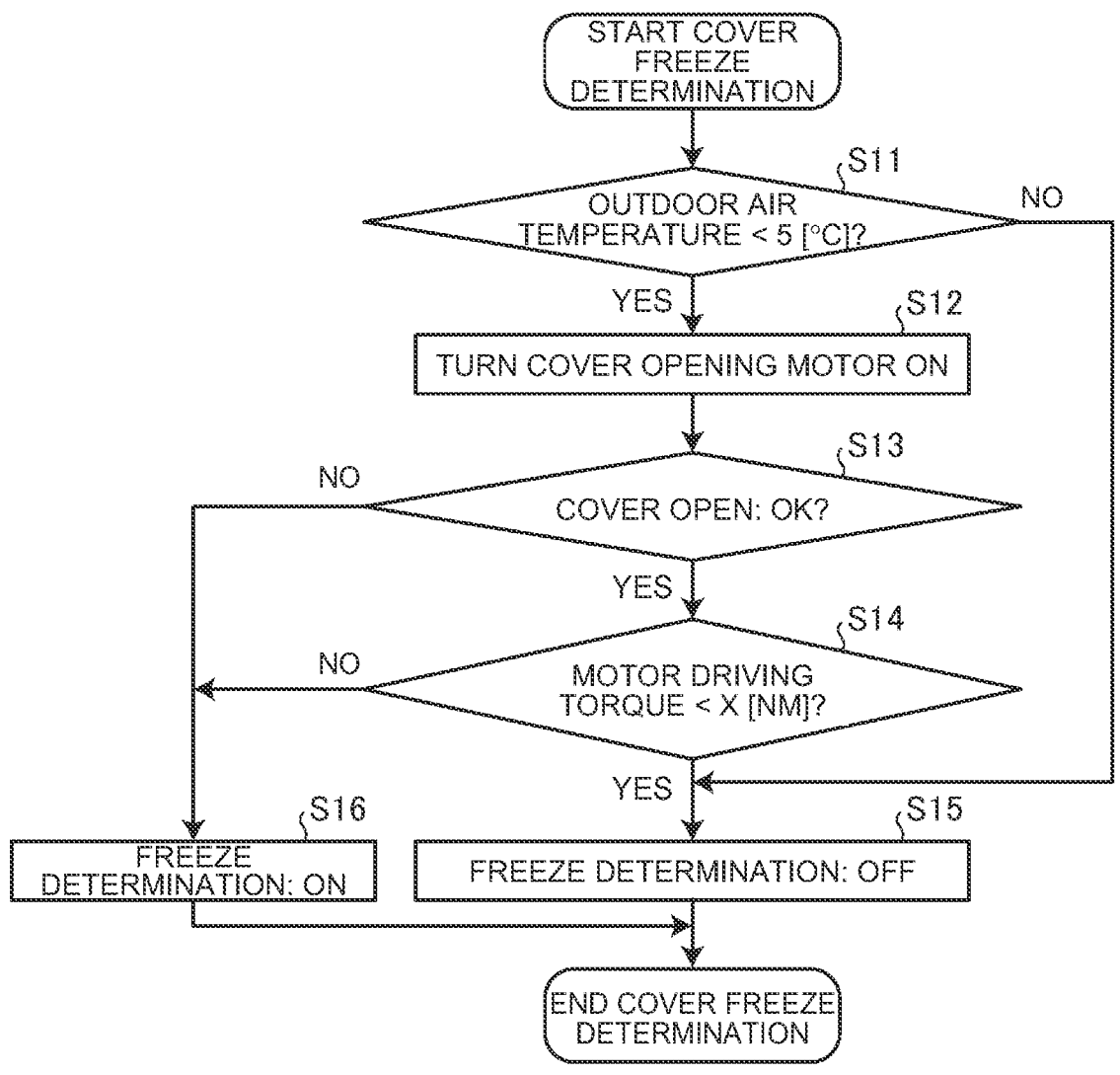
FIG. 6 is a flowchart showing one example of control performed by cover freeze determination.

FIG. 5 is a flowchart showing one example of unfreezing control of the inlet cover 52 according to the embodiment. FIG. 6 is a flowchart showing one example of control performed by cover freeze determination.

First, as shown in FIG. 5, the ECU 2 performs cover freeze determination that determines whether the inlet cover 52 is frozen (Step S1). As shown in FIG. 6, when the cover freeze determination is started, the ECU 2 determines whether a relationship of the outdoor air temperature<5 [° C.] is satisfied on the basis of a detection result of a temperature sensor provided in the vehicle 1 (Step S11). When the ECU 2 determines that the relationship of the outdoor air temperature<5 [° C.] is not satisfied (No in Step S11), the ECU 2 determines that the inlet cover 52 is not frozen (freeze determination: OFF) (Step S15). Then, the ECU 2 ends the cover freeze determination and transitions to processing of Step S2 in the flowchart shown in FIG. 5.

Meanwhile, when the ECU 2 determines that the relationship of the outdoor air temperature<5 [° C.] is satisfied (Yes in Step S11), the ECU 2 turns ON a cover opening motor provided in a driving apparatus that automatically opens and closes the inlet cover 52 and executes an opening operation of the inlet cover 52 (Step S12). Next, the ECU 2 determines whether the inlet cover 52 has opened (Step S13). When the ECU 2 determines that the inlet cover 52 has opened (cover open: OK) (Yes in Step S13), the ECU 2 determines whether a motor driving torque of the cover opening motor is less than a preset threshold value torque X [Nm] (motor driving torque<X [Nm]) (Step S14). When the ECU 2 determines that the motor driving torque is less than threshold value torque X [Nm] (motor driving torque<X [Nm]) (Yes in Step S14), the ECU 2 determines that the inlet cover 52 is not frozen (freeze determination: OFF) (Step S15). Then, the ECU 2 ends the cover freeze determination and transitions to the processing of Step S2 in the flowchart shown in FIG. 5.

When the ECU 2 determines that the inlet cover 52 is not open (cover open: NO) in Step S13 (No in Step S13), the ECU 2 determines that the inlet cover 52 is frozen (freeze determination: ON) (Step S16). Then, the ECU 2 ends the cover freeze determination and transitions to the processing of Step S2 in the flowchart shown in FIG. 5.

When the ECU 2 determines that the motor driving torque is not less than the threshold value torque X [Nm] (the motor driving torque≥X [Nm]) in Step S14 (No in Step S14), the ECU 2 determines that the inlet cover 52 is frozen (freeze determination: ON) (Step S16). Then, the ECU 2 ends the cover freeze determination and transitions to the processing of Step S2 in the flowchart shown in FIG. 5.

Returning to FIG. 5, after the cover freeze determination in Step S1, the ECU 2 determines whether the inlet cover 52 is frozen on the basis of the determination result of the cover freeze determination (Step S2). When the ECU 2 determines that the inlet cover 52 is frozen (Yes in Step S2), the ECU 2 turns the charging relay 4 ON and places the charging relay 4 in a closed state (Step S3). As a result, electricity is supplied to the charging terminals 511 of the charging inlet 5 from the battery 3, the electricity is supplied to the heater 53 via the heater terminals 521 of the inlet cover 52, and the inlet cover 52 is heated. Then, the ECU 2 transitions to the processing of Step S1 after a predetermined amount of time elapses after the charging relay 4 is turned ON, for example. Meanwhile, when the ECU 2 determines that the inlet cover 52 is not frozen (No in Step S2), the charging relay 4 is turned OFF and the charging relay 4 is placed in an open state (Step S4). Then, the ECU 2 ends the series of cover freeze prevention control and transitions to a predetermined automatic charging control.

In the vehicle 1 according to the embodiment, when the inlet cover 52 freezes, the inlet cover 52 can be unfrozen as a result of turning the charging relay 4 ON, supplying electricity to the heater 53 from the battery 3, and heating the inlet cover 52 by the heat of the heater 53. After the inlet cover 52 is unfrozen and becomes automatically openable, the ECU 2 can start the automatic charging by communicating with the automatic charging apparatus 8 and automatically connecting the charging connector 82 to the charging inlet 5 by the automatic charging apparatus 8.

In the vehicle 1 according to the embodiment, there is a possibility that the inlet cover 52 may be determined to be frozen when the processing of Step S1 to Step S3 is repeated by a predetermined number of times, in other words, even when it is determined that the inlet cover 52 is frozen in the cover freeze determination, the charging relay is turned ON, and the inlet cover 52 is heated by the heater 53 by a predetermined number of times in the flowchart shown in FIG. 5. In this case, the ECU 2 executes fail processing of ending the series of unfreezing control of the inlet cover 52 by determining that some kind of abnormality has occurred, for example. For example, a temperature sensor that detects the temperature of the charging terminals 511 is provided in the charging inlet 5, and the fail processing is executed as a result of determining that an energization abnormality has occurred in not only the charging terminals 511 but also the heater 53 when the temperature of the charging terminals 511 is less than a predetermined temperature even when the charging relay 4 is turned ON. When the fail processing is executed, it is desired that the ECU 2 notifies the user of the vehicle 1 by performing display on a display apparatus such as a display (not shown) provided in the vehicle 1, for example.

What is claimed is:

1. A charging inlet, comprising:
a casing inside which a charging terminal to be electrically connected to an electricity storage apparatus provided in a vehicle is housed; and a cover member provided in the casing so as to be able to open and close an opening portion formed in the casing, the charging inlet electrically connecting the charging terminal and a terminal of a charging connector to each other by inserting the charging connector from the opening portion in a state in which the cover member is open, the charging inlet further comprising:

a heater that is provided in the cover member and heats the cover member by generating heat by energization; and a heater terminal provided on the cover member and electrically connected to the heater, wherein the heater terminal is disposed on a surface of the cover member facing the charging terminal such that the charging terminal and the heater terminal come into contact with each other in a state in which the cover member is closed.

2. The charging inlet according to claim 1, further comprising an automatic opening/closing apparatus that automatically opens and closes the cover member.

* * * * *